(12) United States Patent
Leister

(10) Patent No.: US 8,441,703 B2
(45) Date of Patent: May 14, 2013

(54) METHOD AND DEVICE FOR HOLOGRAPHICALLY RECONSTRUCTING A SCENE

(75) Inventor: Norbert Leister, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 532 days.

(21) Appl. No.: 12/670,886

(22) PCT Filed: Jul. 25, 2008

(86) PCT No.: PCT/EP2008/059765
§ 371 (c)(1),
(2), (4) Date: Jan. 27, 2010

(87) PCT Pub. No.: WO2009/016105
PCT Pub. Date: Feb. 5, 2009

(65) Prior Publication Data
US 2010/0188719 A1 Jul. 29, 2010

(30) Foreign Application Priority Data
Jul. 27, 2007 (DE) .......................... 10 2007 036 127

(51) Int. Cl.
*G03H 1/08* (2006.01)
(52) U.S. Cl.
USPC ................................................ 359/9; 359/32
(58) Field of Classification Search .......................... None
See application file for complete search history.

(56) References Cited

U.S. PATENT DOCUMENTS

| | | | |
|---|---|---|---|
| 5,589,955 A * | 12/1996 | Amako et al. .................... 359/9 |
| 7,636,184 B2 | 12/2009 | Schwerdtner | |
| 2006/0055994 A1 | 3/2006 | Schwerdtner | |
| 2008/0198431 A1 | 8/2008 | Schwerdtner | |
| 2009/0296176 A1 * | 12/2009 | Leister .............................. 359/9 |
| 2009/0322738 A1 * | 12/2009 | Cable ............................ 345/419 |
| 2010/0097672 A1 * | 4/2010 | Leister .............................. 359/9 |
| 2010/0149611 A1 * | 6/2010 | Leister ........................... 359/32 |
| 2010/0194745 A1 * | 8/2010 | Leister et al. .................. 345/419 |
| 2011/0176190 A1 * | 7/2011 | Golan et al. ....................... 359/9 |

FOREIGN PATENT DOCUMENTS

| | | |
|---|---|---|
| EP | 0 590 828 | 4/1994 |
| WO | WO 2004/044659 | 5/2004 |
| WO | WO 2006/066919 | 6/2006 |
| WO | WO 2008/138885 | 11/2008 |

OTHER PUBLICATIONS

International Search Report, dated Feb. 20, 2009, issued in priority International Application No. PCT/EP2008/059765.

* cited by examiner

*Primary Examiner* — Arnel C Lavarias
(74) *Attorney, Agent, or Firm* — Saul Ewing LLP

(57) ABSTRACT

A holographic reconstruction device is designed such that visible resolution of the reconstruction of a scene is matched to the resolution capability of the human eye, to the imaging properties of the reconstruction means used or to the resolution capability of the light modulation means used. A grid scale for the object points is generated by system control means in each case in a plane of intersection, which grid scale cannot be used to separately resolve adjacent object points in the plane of intersection, and the compilation of object points of the respective plane of intersection to form an object point group with adjacent object points which can be separately resolved is carried out. In holographic displays, the invention is used to reduce speckle patterns and reduce the number of the holograms of object points of the scene, which are to be calculated and coded, and the calculation complexity.

18 Claims, 3 Drawing Sheets

METHOD AND DEVICE FOR HOLOGRAPHICALLY RECONSTRUCTING A SCENE

CROSS REFERENCE TO RELATED APPLICATIONS

This application claims the priority of PCT/EP2008/059765, filed on Jul. 25, 2008, which claims priority to German Application No. 10 2007 036127.2, filed Jul. 27, 2007, the entire contents of which are hereby incorporated in total by reference.

BACKGROUND OF THE INVENTION

The present invention relates to a device for generating a holographic reconstruction of a three-dimensional scene, which comprises a number of objects. To be able to compute and to encode holograms of the scene, the scene is divided into individual object points, which are combined to form object point groups that are represented in a light modulator means in the form of computer-generated holograms (CGH). Using coherent light and a reconstruction means, individual reconstructions are generated of each object point group and superposed so that an observer sees from an eye position the temporally averaged scene with reduced speckle patterns. The present invention further relates to a method for generating a holographic reconstruction of a scene such to allow speckle patterns to be reduced.

This invention can be applied in conjunction with devices which allow complex wave fronts of a three-dimensional scene to be recorded and reconstructed with the help of holography using coherent laser light in real-time or in near-real-time, where the reconstruction can be seen from a visibility region, which is also called an observer window. A light modulator means with controllable elements is provided for modulating the wave fronts of the incident coherent light with the complex values of the scene.

A particular type of a holographic display in which the novel method can be applied is known from earlier documents filed by the applicant, e.g. from (1) EP 1 563 346 A2, (2) DE 10 2004 063 838 A1 or (3) DE 10 2005 023 743 A1. There, the hologram computation is executed on the following basis: For encoding and holographic reconstruction, a three-dimensional scene is sliced into section layers, each of which comprising a multitude of object points of the scene. The object points characterise both the surfaces and, as the sum of all surfaces, the three-dimensional scene. They are written as complex values to (or encoded in) multiple controllable elements of the light modulator means, each object point thus forming a separate region on the light modulator means. Such a separate region is referred to as the sub-hologram of this object point. The sub-hologram corresponds roughly to a holographically encoded lens function which reconstructs this one object point in its focal point. The absolute value of the complex values, i.e. the amplitude, is about constant across the entire sub-hologram, and its magnitude depends on the axial distance of the object point to the screen and on the intensity of the object point. The phase distribution of the complex values in the sub-hologram corresponds roughly to the function of a lens whose focal length depends on the axial distance of the object point to the light modulator means or screen. As coherent light passes through the light modulator, the complex values which are written to the controllable elements of the sub-hologram modify the amplitude and/or phase of the light. The object point can be reconstructed by the modulated light. Outside the sub-hologram, this object point has the value '0' in the light modulator means. The total encoded hologram of the scene is generated by adding the complex values of the individual sub-holograms.

The holographic reconstruction of the scene is generated by a reconstruction means in a reconstruction space which stretches between the visibility region and the light modulator means. The wave fronts which are emitted by the encoded holograms of the scene are superposed in the visibility region, so that the reconstructed object points can be seen there from an eye position. The reconstruction is generated based on the superposed wave fronts in that individual perspective views of the scene are generated for each eye of an observer in a time- or space-division multiplex process, where said views differ in parallax, but are perceived by the brain as a single holographic 3D representation.

For watching the reconstruction of the three-dimensional scene, the observer can either look at a light modulator means on which a hologram of the scene is directly encoded, and which serves as a screen. This is referred to as a direct-view arrangement. Alternatively, the observer can look at a screen onto which either an image or a transform of the hologram values which are encoded on the light modulator means is projected. This is referred to as a projector arrangement. The eye positions of observers are detected by a position finder in a known manner, said position finder being linked by software means with a storage means and a computing unit, and with a system controller means. The storage means also hosts the information of the object points which are necessary for computing the CGH in data records in the form of a look-up table.

Because the light modulator means only allows discrete recording, the object points of the scene are scanned discretely for hologram computation. Certain encoding methods provide the possibility to generate a reconstruction which fully corresponds with the scanned scene at the position of the scanning points. However, the physical reconstruction results in a continuous gradient of the reconstructed intensity, also between the scanning points. These positions show deviations from the intensity gradients in the scene, which cause the speckle patterns in the reconstruction and which thus deteriorate the quality of the holographic representation. This is in particular the case when the hologram is computed with a random phase of the object points. Generally, a speckle pattern can be described as a granulation-like interference pattern which is created as a spatial structure with randomly distributed intensity minima and maxima by interference of multiple light waves with statistically irregularly distributed phase differences. These speckle patterns substantially deteriorate the quality of the perception of the reconstructed scene.

Speckle patterns can generally be reduced by temporal and/or spatial averaging during the reconstruction of the three-dimensional scene. The observer eye always averages out multiple reconstructions presented to it, where each of these reconstructions has a different speckle pattern. The speckle pattern will for example be random and different if the object points of the scene exhibit different random phases. Thanks to the averaging effect, the observer perceives a minimisation of this speckle pattern. Temporal averaging with the aim to reduce speckle patterns is for example described by Donghyun Kim in the document "Reduction of coherent artifacts in dynamic holographic three-dimensional displays by diffraction-specific pseudorandom diffusion". Different holograms of a scene are computed and displayed one after another, where the individual object points of the scene are superposed with varying relative phase differences. The eyes thus temporally average away the interference effects, i.e. the speckle patterns. However, one has to accept greater computational load caused by the need to compute multiple holograms with this method, because each hologram is always computed for all object points. This can be a substantial drawback in real-time representation of reconstructed scenes. Moreover, inexpensive light modulator means with shorter switching times are required for the holographic representation. Such devices are not yet commercially available.

Further, the resolving capacity of the human eye must be taken into consideration when reconstructing a scene in a holographic display. In order to ensure that planar surfaces in a scene are perceived as continuous planes by an observer, and not as a collection of individual points, a critical distance between adjacent object points must not be exceeded within this plane or section layer when arithmetically dividing the scene into object points. However, in particular those interferences which occur between object points which lie close to each other contribute the major share to the speckle patterns which need to be eliminated.

SUMMARY OF THE INVENTION

It is the object of this invention to design the process of computing and encoding computer-generated holograms (CGH) of a scene such that the occurrence of speckle patterns in the holographic reconstruction of the scene is widely suppressed without increasing the computational load. At the same time, the holographic representation of the scene shall generally be visible at good quality in an accordingly designed holographic reconstruction device.

The general method of hologram computation and holographic reconstruction of a three-dimensional scene which is used in conjunction with this invention is described in the prior art. It is based on the fact that the scene is composed of objects, which in turn are composed of object points. Various means are provided for reconstructing the scene, said means being united in or interact with system controller means. They allow object points to be selected and combined to form object point groups, whereupon object point groups can be computed and represented as individual CGH. By way of an interaction of the various means, a superposition of the light wave fronts of the individual reconstructions of the object point groups is achieved, so that the eyes of an observer see the resultant reconstruction of the scene at an eye position.

Based on this principle, the object is solved according to this invention by a device in which both the selection of object points in the section layers according to the grid, and the combination of object points to form object point groups is performed by system controller means in dependence on the visible resolution of the reconstruction of the scene. In order to achieve an adaptation to the visible resolution of the reconstruction of the scene by system controller means, In each section layer a grid is defined for the object points with a pitch at which adjacent object points in the section layer cannot be resolved as separate points by the observer, and Such object points of the respective section layer which can be resolved as separate points by the observer are combined to form an object point group.

In doing so, each object point of the sliced scene is selected for the reconstruction. It is therefore preferably achieved that each object point is assigned to an object point group only once, and that consequently fewer holograms of object point groups need to be computed and encoded. In addition to reducing the occurrence of speckle patterns, the computational time is generally reduced.

According to the present invention, it is suggested to adapt the visible resolution of the reconstruction of the scene to the resolving capacity of the human eye. The resolving capacity of the eye is described by an Airy function $2*j1(r-r0)/(r-r0)$, where $r0=(x0, y0)$ is the co-ordinate of an object point, $r-r0$ is the distance to this co-ordinate within a section layer and $j1$ is a Bessel function. To be able to realise the Airy function, the device is provided with a position finder for detecting the information about the actual eye position of at least one observer and about the actual size of the eye pupil of that observer. Further, the device is provided with computing units for computing based on the distance of the actual eye position to the respective section layer of the scene and on the actual eye pupil diameter of an observer an object point density which is used by the system controller means to determine the pitch of the object points in the respective section layer.

The actual pupil diameter can alternatively be found based on a brightness value in that the position finder is fitted with a sensor for detecting an actual brightness value of the reconstructed scene or of ambient light in a reconstruction space.

According to the present invention, the visible resolution of the reconstruction of the scene can further be adapted to the imaging properties of the reconstruction means. For this purpose, it is suggested to find the imaging properties of the reconstruction means either by way of a simulation or based on a measured curve. At this, the point spread function for an imaging of the light source into different section layers can be determined with the help of a combination of the reconstruction means and a lens which is encoded on the light modulator means, either calculated with a suitable optics software or found empirically. In particular, the lateral distances between the object points, which are characterising of the visible resolution, can be taken from the simulation or measured curve and be stored in the respective data records in the storage means. It is further provided that the system controller means select the object points in a section layer depending both on an actual eye position of the observer and on the resolution of the reconstruction means, and combine them so to form object point groups.

The device according to this invention is further designed such that the system controller means control the process of encoding of the CGH on the light modulator means and of subsequent reconstruction of the object point groups of the scene. For this, the object point groups are encoded two-dimensionally on the light modulator means. However, they may also be encoded one-dimensionally on the light modulator means.

The object of this invention is also solved by a method for holographically reconstructing a scene, where the process steps of said method can be carried out mainly with the above-described means of the device. The method is characterised in that the system controller means perform both the selection of object points in the section layers according to the grid and the combination of object points to form object point groups in dependence on the visible resolution of the reconstruction of the scene. For this, the system controller means Define in each section layer a grid for the object points with a pitch at which adjacent object points in the section layer cannot be resolved as separate points by the observer, and Combine those object points of the respective section layer which can be resolved as separate points by the observer to form an object point group.

The process step of the incoherent superposition of the individual reconstructions can be carried out sequentially, so that the eyes of the observer temporally average out the intensity of the reconstruction over the sum of the intensities of the individual reconstructions. However, it is also possible to perform the incoherent superposition of the individual reconstructions simultaneously. For this, the light modulator means comprises multiple light modulators on which a CGH is encoded simultaneously.

Based on these CGHs, multiple individual reconstructions which have mutually different speckle patterns and whose light wave fronts are simultaneously generated and superposed at the position of the observer eye with the according number of reconstruction means.

Further, the visible resolution of the reconstruction of the scene can be adapted to the resolution of the light modulator means.

In an embodiment of the invention, a method for holographically reconstructing a colour scene is described where the colour scene is divided into different colour components by software means in the system controller means, and where the colour reconstruction of the scene is composed of at least two different monochromic reconstructions of different wavelengths of the light, where a division of the scene into object points, a combination of the object points to form object point groups, and a computation of the monochromic CGHs is performed separately for each colour component.

In an embodiment of the method, where the three primary colours are used, it is provided that different pitches are defined for each wavelength of the three primary colours, and different minimum distances are defined for the object point groups by the computing units in the data records of the object points for the grid in a section layer. A different, purposeful process step provides that same grid pitches are defined for each wavelength of the three primary colours, and same minimum distances are defined for the object point groups by the computing units in the data records of the object points.

In another process step for colour reconstruction of the scene, the pitch of the object points of the scene is defined by the computing units to be so small that for the wavelengths of the three primary colours the object points can no longer be resolved as separate points. Further, the minimum distance among the object points within an object point group, which forms the second criterion to be satisfied, is defined by the computing units to be so large that for the wavelengths of the three primary colours the object points can be resolved as separate points.

Computing and encoding computer-generated holograms (CGHs) of a scene in a holographic reconstruction device which is characterised by the features described above have the following benefits as compared to the prior art:

The occurrence of speckle patterns in the holographic reconstruction of the scene can be widely suppressed.

Each object point is used only once in a computation.

In the embodiment which features sequential representation, only few single holograms must be computed and displayed one after another.

The demands to be made on computational power and speed are reduced.

BRIEF DESCRIPTION OF THE DRAWINGS

The invention will now be explained in more detail with the help of embodiments in conjunction with the accompanying drawings, wherein.

DETAILED DESCRIPTION

The holographic reconstruction device according to this invention comprises at least one light modulator means, a reconstruction means and a light source means, which can be separate units or be combined in one unit. Further, system controller means are provided which comprise multiple storage means and computing units for executing the computations and for co-ordinating the processes in the holographic reconstruction device with the help of software means. The process according to the present invention will be described mainly with the example of two object points, which stand for the entire scene.

As already mentioned above, the diffraction of the coherent light emitted by the light source means brings about disturbing interference maxima and interference minima between individual object points of a scene. The observer perceives them as a disturbing granular structure, which is known as speckle pattern. The invention eliminates the speckle patterns in that the visible resolution of the reconstruction of the scene is adapted to the resolving capacity of the eye or to the imaging properties of the reconstruction means or to the resolution of the light modulator means. At this, the object points of the scene must satisfy two criteria, which are explained in more detail in the description of the embodiments.

An observer sees a reconstruction with his eye pupil. The pupil has the function of a diffraction-limiting aperture. With a circular aperture, such as the eye pupil, the resolving capacity of the eye and thus the curve of the amplitudes of object points is generally described by the Airy function $$2*j1(r-r0)/(r-r0)$$

where $r0=(x0, y0)$ is the co-ordinate of an object point, $r-r0$ is the distance to this co-ordinate within a section layer of the scene, and $j1$ is a Bessel function. Provided that no other limiting factors are given by the reconstruction means, the observer perceives an object point as an Airy disc. This Airy disc has the diameter of $Bd=1.22\ \lambda D/dp$, where $D$ is the distance between the plane of the actual eye position and the respective section layer, $\lambda$ is the wavelength of the light, and $dp$ is the diameter of the eye pupil. Two object points which are situated at the positions $r0a$ and $r0b$ can just be resolved as separate points if their mutual distance is $r0b-r0a \geq 1.22\ \lambda D/dp$. The maximum of the function $J1(r-r0a)/(r-r0a)$ for one object point then coincides with the first minimum of the function $J2(r-r0b)/(r-r0b)$ for the other object point.

Figure 1:
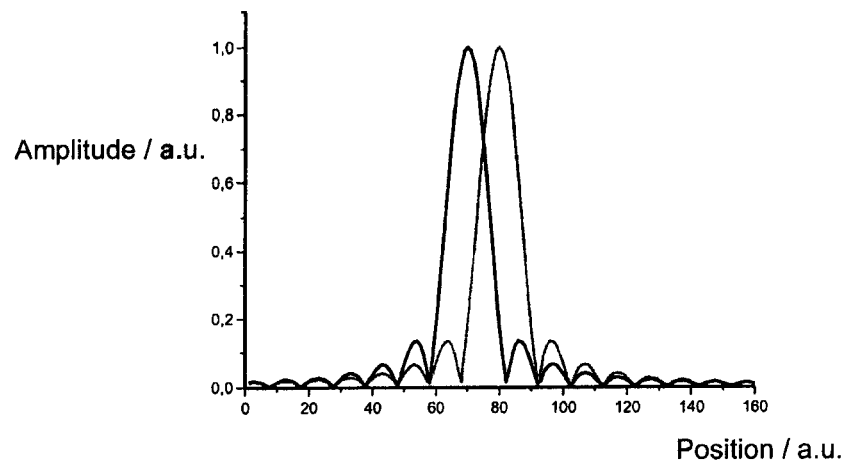
FIG. 1 shows the curve of the amplitude of the Airy function for two object points which can no longer be resolved as separate points.

FIG. 1 shows the amplitude curves of two object points which are situated at a distance of $1.0\ \lambda D/dp$. The amplitudes overlap clearly and the two points cannot be resolved as separate points by observer eyes. If the Airy discs of two object points are situated close to each other and overlap, the relative phases of the two object points substantially affect the resultant coherent reconstruction of these object points. Therefore, noticeable intensity maxima can occur with constructive interference, and noticeable intensity minima can occur with destructive interference.

Figure 2:
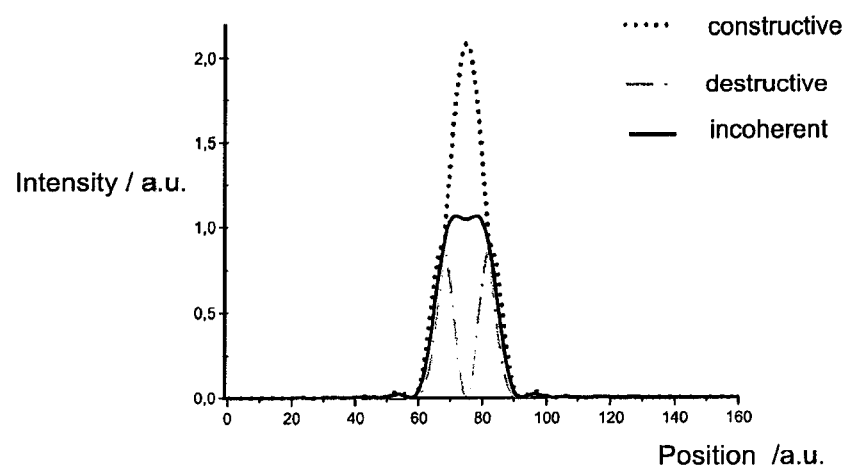
FIG. 2 shows the computed intensities for destructive and constructive interference and for incoherent superposition of these object points.
Figure 7:
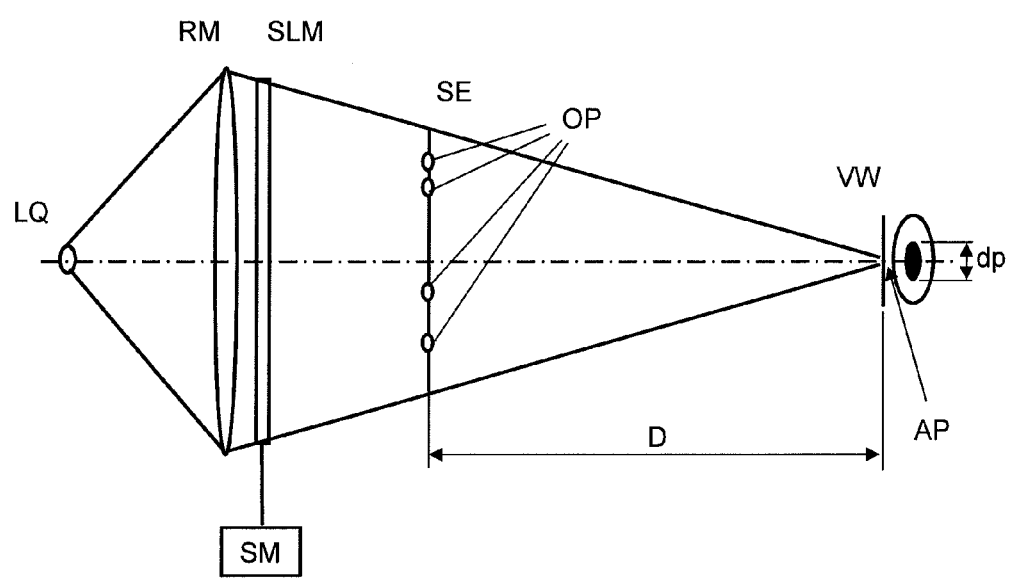
FIG. 7 is a schematic diagram that shows the main components of a holographic display according to the present invention.

FIG. 2 shows the computed intensities for destructive and constructive interference and for incoherent superposition of the object points of FIG. 1 at one position. The incoherent superposition corresponds roughly with the expected value for a planar scene. If more than two object points in the grid are taken which have that distance next to each other, the generated reconstruction of these object points forms a continuous planar surface with about constant intensity. In the general case of coherent superposition, the intensity is somewhere between the extreme cases of destructive and constructive interference—depending on the relative phase of the two object points. In contrast, the interference with the coherent superposition of multiple object points would cause a speckle pattern. Referring to FIG. 7, the observer sees the reconstruction of the scene from the eye position AP, which lies within a visibility region, which is also referred to as an observer window VW. This observer window VW is typically somewhat larger than the eye pupil. The difference in optical path length of the light from different object points OP to the observer window VW is material to the kind of interference that occurs. However, this difference in optical path length varies depending on the position of the eye pupil within the observer window VW. This is why different interferences may occur if the eye moves within the observer window VW. In an extreme case, the type of interference may change from constructive to destructive or vice versa. Now, in order to enable an observer to watch a reconstruction at high quality from any eye position AP within the observer window VW, it is necessary to have only little difference between constructive and destructive interference.

Figure 3:
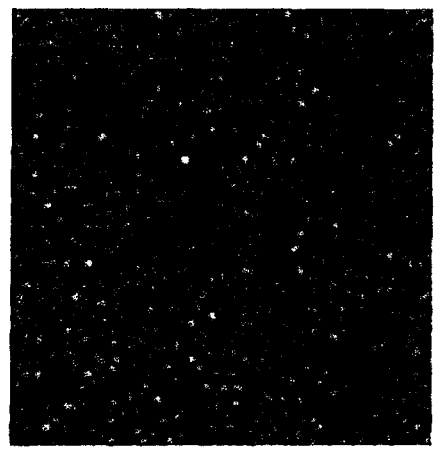
FIG. 3 shows a simulation of the reconstruction of a planar scene of object points computed with random phases, with an object point distance according to FIGS. 1 and 2.

FIG. 3 shows a simulation of the reconstruction of a planar scene, i.e. a two-dimensional arrangement, of object points computed with random phases, with an object point distance according to FIGS. 1 and 2. As a result, a disturbing speckle pattern can be seen instead of a uniformly bright surface. This speckle pattern is caused by the interference of the two object points. If the observer moved within the observer window, the speckle pattern would change its appearance.

In order to realise a uniformly brightly lit surface without disturbing speckle patterns, the visible resolution of the reconstruction of the scene must be adapted either to the resolving capacity of the eye or for example to the resolution or the imaging properties of the reconstruction means.

If the Airy discs of different object points are situated at a certain distance, only the smaller secondary maxima will interfere. Consequently, there will only be little difference between the destructive and constructive interference or incoherent superimposition of the Airy discs of the object points.

Figure 4:
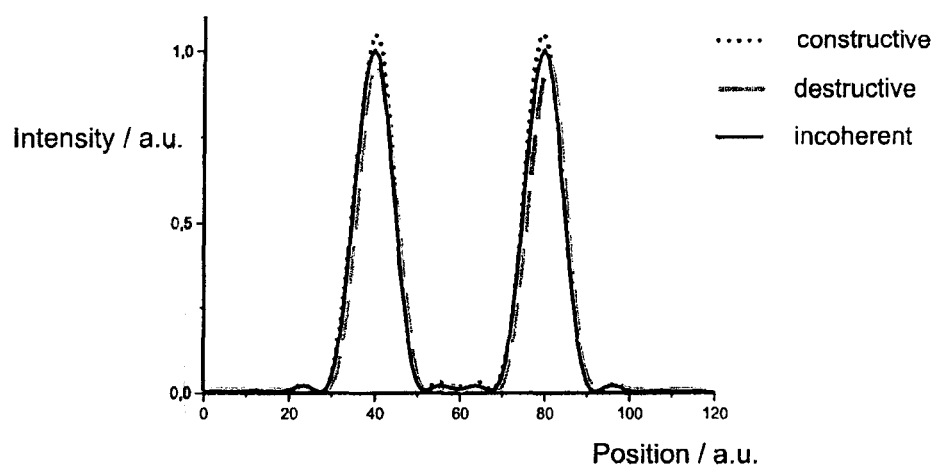
FIG. 4 shows the analogous superpositions for a quadrupled distance between the two object points of FIG. 2.

Speckle patterns are reduced even better if two adjacent object points are selected for the assembly of an object point group which are situated at a sufficiently large distance. FIG. 4 shows, accordingly, a superposition of the intensities for a quadrupled distance between two object points, i.e. for r0a−r0b=4.0 λD/dp. The intensity values for constructive and destructive interference and for incoherent superposition of the two object points show only little difference here. The two object points are thus perceived as two clearly separate points in the reconstruction.

Figure 5:
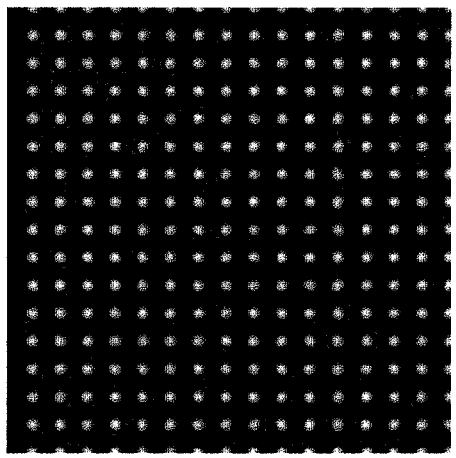
FIG. 5 shows a simulation of the reconstruction of a planar scene of object points computed with random phases, with an object point distance according to FIG. 4.

FIG. 5 shows a simulation of the reconstruction of a two-dimensional arrangement of object points computed with random phases, with an object point distance according to FIG. 4. The object points are clearly resolved as individual points. No speckle patterns occur due to the larger mutual distance between the object points.

However, a single hologram as shown in FIG. 5 does no allow a continuous surface to be displayed. The superposition of multiple reconstructions with an object point distance as shown in FIG. 5 is necessary, but with displaced object points. For this displacement, a two-dimensional arrangement of object points is initially used with a distance of 1.0 λD/dp, as shown in FIG. 1. These object points are assigned to different object point groups such that they have a minimum distance of 4.0 λD/dp, as shown in FIG. 4. A hologram is then computed from each object point group and encoded on the light modulator means.

Figure 6:
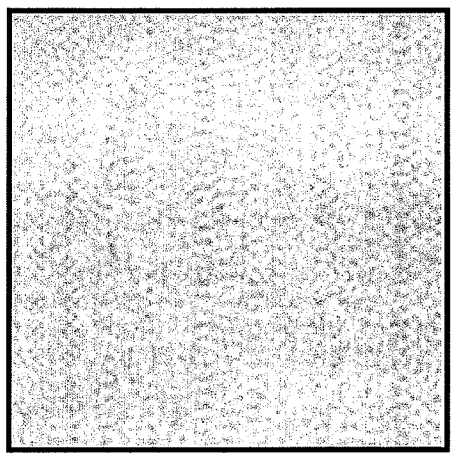
FIG. 6 shows a simulation of a reconstruction, where 16 individual reconstructions were generated and incoherently superposed.

The picture in FIG. 6 shows a simulation of a reconstruction where 16 individual reconstructions were generated based on 16 single holograms and incoherently superposed. The hologram shown in FIG. 5 was used for this simulation. For this, a grid was defined for the object points with a pitch of 1.0 λD/dp both in horizontal and vertical direction for an area representative of a section layer. The object points were combined to form 16 object point groups. Within an object point group, the object points have a minimum distance of 4.0 λD/dp both in the horizontal and vertical direction. 16 holograms were computed based on these 16 object point groups. The reconstructions of all 16 holograms were superposed incoherently as regards their intensity. This means that the intensities of the individual reconstructions were added to get a resultant intensity. The result is a reconstructed planar surface which is lit with uniform brightness and which shows substantially fewer speckle patterns compared with that of FIG. 4.

The schematic diagram in FIG. 7 shows the main components of a holographic display according to the present invention in the form of a direct-view display. In this diagram, LQ is a light source means, RM is a reconstruction means, SLM is a light modulator means, SM are system controller means, SE is one of the multiple section layers with object points OP, VW is an observer window, and AP is an eye position in the observer window VW. The section layer is situated at the distance D from the observer window VW, and the eye pupil is shown to have the diameter dp. A reconstruction space, in which an observer sees the reconstructed scene from the eye position AP, stretches from the observer window VW to the SLM. Two object points are drawn so closely to each other in the section layer that they cannot be resolved as separate points by the observer. The other two object points are situated at a larger mutual distance, and both belong to one object point group.

The present invention will be described in detail below with the help of several embodiments. In a first embodiment of this invention it is shown how the visible resolution of the reconstruction of a scene is adapted to the resolving capacity of an observer eye. In a first process step, the system controller means define a grid of intersecting points of horizontal and vertical lines in a section layer of the scene. The pitch of the grid depends on an actual eye position of an observer. Either, a fix distance is given between that eye position and the section layers; the observer must then be situated at a fix position. Or the distance is detected by a position finder. Further, the size of the pupil of the observer eye is must be known for the computations. For this, a typical diameter of the eye pupil is used by the process, or the actual diameter of the eye pupil is detected by the position finder or by a dedicated sensor and stored in storage means. Another possible device for determining the actual size of the eye pupil is designed such that a sensor detects the actual brightness value of the scene to be reconstructed or of the ambient light in a reconstruction space and transmits this value to the computing units, which compute the pupil size from that information. Then, the pitch of the grid of the respective section layer and the minimum distance between the object points are adapted by the system controller means to that value in order to be able to compute the individual CGHs.

Based on the distance of the respective section layer of the scene to the eye position and on the diameter of the eye pupil, the computing units, which are components of the system controller means, compute an object point density which is greater than the resolving capacity of the eye. Based on this object point density, the system controller means defines the pitch of adjacent object points in the respective section layer. In either direction, the grid lines run parallel and have the same distance to each other. However, because of the different distances between the individual section layers and the eye position of the observer, the pitches differ among the individual section layers.

Object points in adjacent grid positions of one section layer have such a lateral distance both horizontally and vertically that they cannot be resolved as separate points, related to a defined axial distance of the eye to this section layer. Multiple adjacent points are then perceived as a continuous planar surface. The first criterion of the invention is thus satisfied, related to the object point density. The characteristic information for an object point to be reconstructed are stored in a data record in storage means of the system controller means, from where they can be retrieved by software means.

In a second process step, the object point density must be reduced in accordance with the second criterion of this invention, in order to be able to see the object points clearly separate again in the reconstruction. Therefore, such object points of a section layer are combined to form object point groups which—according to the stored data—have a mutual distance at which they are clearly perceived as separate points by an observer who is situated at a defined axial distance to that section layer.

In the device according to this invention, a computer-generated hologram (CGH) is computed of each object point group and encoded on a light modulator means which is illuminated by coherent light that is emitted by a light source means in further process steps. The light modulator means comprises controllable elements, e.g. regularly arranged pixels, for the modulation of the wave fronts of the incident coherent light. For one-dimensional encoding, for example 2, 3 or 4 object point groups, and for two-dimensional encoding, for example 4, 9 or 16 object point groups are formed and the according holograms are computed. The number of individual reconstructions to be generated is accordingly high.

A reconstruction means of the holographic device generates an individual reconstruction of each object point group. The system controller means superpose the reconstructions incoherently, so that a single holographic reconstruction of the scene becomes visible in the plane of the actual eye position of an observer.

The incoherent superposition of the individual reconstructions at the eye position can be performed sequentially. The individual reconstructions are superposed at such fast pace that the eyes of the observer temporally average out the intensity of the reconstruction over the sum of the intensities of the individual reconstructions. Alternatively, the incoherent superposition of the individual reconstructions can be performed simultaneously, in that multiple light modulators and multiple reconstruction means generate multiple reconstructions at the same time and superpose them incoherently at the position of the observer eye. Object points of the scene which satisfy the two criteria mentioned above will exhibit no or only few speckle patterns when being reconstructed. In either case, the observer sees from the actual eye position the averaged reconstruction of the entire scene with only little speckle.

In a second embodiment of this invention, the visible resolution of the reconstruction of the scene is adapted to the resolution of a reconstruction means. This means that instead of the effect of the eye pupil the effect of the pupil of the optical reconstruction system or its imaging quality is considered, where the optical reconstruction system is a component of the reconstruction means. It can for example also be the case that the spatial extent of the light source, or a non-ideal representation of the values encoded on the SLM, or aberrations in the optical reconstruction system may cause an individual object point to be reconstructed in an enlarged fashion. The visible resolution of the object point is then not defined by the diffraction-limiting size of the eye pupil. In such case, the initial object point density must be chosen such that the object points which are actually reconstructed by the entire reconstruction device are just not perceived as separate points, but as a continuous surface.

For this, at least one measured curve for the reconstruction of a single object point e.g. at various distances to the SLM with the optical reconstruction system provided for the holographic reconstruction is established and stored in the storage means in one process step. Optionally, a parameter which characterises the object point and which is computed from that measured curve, can be stored in the storage means. The system controller means determine based on the width and run of that measured curve the object point density and define a grid for the object points of the scene depending on the actual eye position of the observer. As already described for the first embodiment, the object point density must then be reduced again. For this, object points with a defined mutual distance are selected and combined to form object point groups such that they can be resolved as separate points. Encoding on the light modulator means and reconstruction of the individual object point groups are performed in analogy with the processes described for the first embodiment of this invention, but considering the imaging quality of the reconstruction means. In a certain variant of this embodiment, the measured curve for the reconstruction of an object point at different distances from the SLM is replaced by a simulation of the properties of the reconstruction device.

According to a third embodiment of this invention, the visible resolution of the reconstruction of the scene can be adapted to the resolution of the light modulator means. The reconstruction of the scene is visible from the eye position in the observer window. The size of the observer window depends on the resolution of the light modulator means:

$$VW\_h, v = D\lambda / p\_h, v$$

where D is the distance between observer eye and light modulator means, $\lambda$ is the wavelength, and $p\_h, v$ is the pixel pitch, i.e. the distance between two pixels in horizontal (h) or vertical (v) direction. The two pixels are controllable elements of the light modulator means in which a complex-valued number is encoded. The observer window generally has a rectangular shape. If the observer window is smaller than the diameter of the eye pupil dp in either the horizontal or vertical direction, or both, the visible resolution of the scene is determined by the extent of the observer window and not by the resolving capacity of the eye pupil. If the observer window is smaller than the diameter of the eye pupil in both dimensions, the product of two sinc functions replaces the Airy function, for example:

$$\text{sinc}(D\lambda/vw\_h) \, \text{sinc}(D\lambda/vw\_v)$$

The device according to this invention and the according method must then be modified analogously to match that resolution.

In a fourth embodiment of this invention, a device and a method for holographically reconstructing a colour scene are provided. The colour scene is divided by software means in the system controller means into different components of the provided colours. The colour reconstruction of the scene is generated from at least two monochromic reconstructions of different wavelengths of the light. The division of the scene into object points, the combination of the object points to form object point groups, and a computation and encoding of the monochromic CGHs is performed separately for each colour component in accordance with the description of the first embodiment of this invention.

To be able to carry out the reconstruction process, the computing units define different grid pitches and different minimum distances for the object point groups for each wavelength of the primary colours used in the data records of the object points. In order to simplify the computations and processes, according to a modification of this process step, same grid pitches are defined for each wavelength of the three primary colours, and same minimum distances are defined for the object point groups by the computing units in the data records of the object points. For this, as a first criterion, the pitch of the object points of the scene is preferably defined by the computing units to be so small that for the wavelengths of the primary colours used the object points can no longer be resolved as separate points. The second criterion of the process is satisfied in that the distance between the object points within an object point group is defined by the computing units to be so large that for the wavelengths of the three primary colours the object points can be resolved as separate points. As the resolution of the reconstruction of the colour scene is adapted for example to the resolving capacity of the eye, a reduction of the number of speckle patterns can be achieved in the reconstruction of the scene. A holographic reconstruction device according to this invention can be designed in the form of a transmission-type or reflection-type holographic display, and be able to serve one observer or multiple observers.

The invention claimed is:

1. Method for holographically reconstructing a scene, comprising:

dividing the scene by parallel section layers into object points by software means, where the object points are selected in accordance with a defined grid in the section layers and combined to form object point groups by system controller means, computing a computer-generated hologram (CGH) of each object point group and encoding on a light modulator means which is illuminated by coherent light that is emitted by a light source means, generating a reconstruction from each CGH of an object point group and superposing the generated reconstructions incoherently by adding up individual CGHs, so that a single holographic reconstruction of the scene becomes visible in a plane of an eye position of an observer, and providing the system controller means with storage means for storing data records of the object points, wherein the system controller means perform both the selection of object points in the section layers according to the grid and the combination of object points to form object point groups in dependence on a visible resolution of the reconstruction of the scene, where the system controller means Generate the section layers at different distances from the eye position and define in each section layer a grid in which the object points are situated so close to each other that their mutual distance is smaller than the visible resolution of the reconstruction of the scene for that section layer, and Combine those object points of the respective section layer whose mutual distance is larger than the visible resolution of the reconstruction of the scene to form an object point group, and compute the CGH of the object point group from the data records which comprise lateral distances between the object points of that group which are characterising of visible resolution and the complex values of the object points.

2. Method according to claim 1, wherein computing units in the system controller means compute based on a distance of the actual eye position to the respective section layer of the scene and on an actual eye pupil diameter of an observer an object point density for determining a pitch of the object points in the section layers.

3. Method according to claim 1, wherein an incoherent superposition of the individual reconstructions is carried out sequentially, so that eyes of the observer temporally average out the intensity of the reconstruction over a sum of the intensities of the individual reconstructions.

4. Method according to claim 1, wherein an incoherent superposition of the individual reconstructions is performed simultaneously, in that multiple light modulators and multiple reconstruction means generate multiple reconstructions at the same time and superpose them incoherently at a position of an observer eye.

5. Method according to claim 1, wherein the visible resolution of the reconstruction of the scene is adapted to a resolution of the light modulator means.

6. Method according to claim 1 for holographically reconstructing a colour scene, where the colour scene is divided into different colour components by software means in the system controller means, and where the colour reconstruction is composed of at least two different monochromic reconstructions of different wavelengths of the light, where a division of the scene into object points, a combination of the object points to form object point groups, and a computation of the monochromic CGHs is performed separately for each colour component.

7. Method according to claim 6, wherein different grid pitches are defined for each wavelength of three primary colours, and different minimum distances are defined for the object point groups by the computing units in the data records of the object points or same grid pitches are defined for each wavelength of the three primary colours, and same minimum distances are defined for the object point groups by the computing units in the data records of the object points.

8. Method according to claim 7, wherein the pitch of the object points of the scene is defined by the computing units to be so small that for the wavelengths of the three primary colours the object points can no longer be resolved as separate points.

9. Method according to claim 7, wherein the distance of the object points within an object point group is defined by the computing units to be so large that for the wavelengths of the three primary colours the object points can be resolved as separate points.

10. Method according to claim 6, wherein each object point of the divided scene is selected only once for one of the object point groups.

11. Method according to claim 1, wherein each object point of the divided scene is selected only once for one of the object point groups.

12. Method according to claim 1, wherein the visible resolution of the reconstruction of the scene is adapted to imaging properties of the reconstruction means.

13. Method according to claim 12, wherein the imaging properties of the reconstruction means are found either by way of a simulation or based on a measured curve.

14. Method according to claim 1, wherein the object point groups are encoded on the light modulator means either one-dimensionally or two-dimensionally.

15. Use of a device for holographically reconstructing a scene, said device executing the method of claim 1.

16. Device for holographically reconstructing a scene with
- a light modulator means which is illuminated with coherent light emitted by a light source means and on which computer-generated holograms (CGHs) of object point groups of the scene are encoded,
- a reconstruction means which generates a reconstruction from each CGH of an object point group and superposes the generated reconstructions incoherently by adding up individual CGHs, so that a single holographic reconstruction of the scene becomes visible in a plane of an eye position of an observer, and
- system controller means for dividing the scene by section layers into object points which are selected in accordance with a defined grid in the section layers and combined to form object point groups, said system controller means comprising storage means for storing data records of the object points, wherein the system controller means are further designed
- To generate the section layers at different distances from the eye position always with a grid in which the object points are situated so close to each other that their mutual distance is smaller than a visible resolution of the reconstruction of the scene for the respective section layer, and
- To combine those object points of the respective section layer whose mutual distance is larger than the visible resolution of the reconstruction of the scene to form an object point group, and to compute the CGH of each object point group from the data records which comprise lateral distances between the object points of that group which are characterising of the visible resolution and complex values of the object points.

17. Device according to claim 16, which is provided with a position finder for detecting information about the actual eye position of at least one observer and about an actual size of an eye pupil of that observer.

18. Device according to claim 16, where a position finder is provided which comprises a sensor for detecting an actual brightness value of the scene to be reconstructed or of ambient light in a reconstruction space, where the brightness value serves to determine an actual diameter of an eye pupil.

\* \* \* \* \*